United States Patent
Vernam et al.

(10) Patent No.: US 9,352,423 B2
(45) Date of Patent: May 31, 2016

(54) SYSTEM AND METHOD FOR POLISHING AND LUBRICATING ALUMINUM WELDING WIRE

(71) Applicant: AlcoTec Wire Corporation, Traverse City, MI (US)

(72) Inventors: Lance T. Vernam, Traverse City, MI (US); Timothy M. Cook, Traverse City, MI (US)

(73) Assignee: AlcoTec Wire Corporation, Traverse City, MI (US)

(*) Notice: Subject to any disclaimer, the term of this patent is extended or adjusted under 35 U.S.C. 154(b) by 612 days.

(21) Appl. No.: 13/799,115

(22) Filed: Mar. 13, 2013

(65) Prior Publication Data

US 2014/0263258 A1    Sep. 18, 2014

(51) Int. Cl.
| | |
|---|---|
| *B23K 9/067* | (2006.01) |
| *B23K 35/02* | (2006.01) |
| *B23K 35/40* | (2006.01) |
| *B24B 5/38* | (2006.01) |
| *B23K 35/28* | (2006.01) |
| *B21C 1/04* | (2006.01) |
| *B24B 27/033* | (2006.01) |

(52) U.S. Cl.
CPC . *B23K 35/02* (2013.01); *B21C 1/04* (2013.01); *B23K 35/0261* (2013.01); *B23K 35/286* (2013.01); *B23K 35/40* (2013.01); *B24B 5/38* (2013.01); *B24B 27/033* (2013.01)

(58) Field of Classification Search
CPC ...... B23K 35/02; B23K 35/40; B23K 35/286; B23K 35/0261; B24B 5/38; B24B 27/033; B21C 1/04
USPC .......................................................... 219/50
See application file for complete search history.

(56) References Cited

U.S. PATENT DOCUMENTS

| | | | |
|---|---|---|---|
| 4,584,169 A | 4/1986 | Werner et al. | |
| 4,913,927 A | 4/1990 | Anderson | |
| 5,382,455 A | 1/1995 | Boockmann | |
| 5,409,535 A | 4/1995 | Boockmann | |
| 5,481,788 A * | 1/1996 | Simon | B21B 37/04 204/200 |
| 5,981,904 A * | 11/1999 | Gordon | C23G 5/00 219/123 |
| 6,365,864 B1 * | 4/2002 | Stava | B08B 7/0071 219/145.22 |
| 6,582,833 B2 * | 6/2003 | Toyoda | B23K 35/0261 219/146.22 |
| 7,626,139 B2 * | 12/2009 | Matsuguchi | B21C 37/042 219/137 R |
| 2005/0045699 A1 | 3/2005 | Konishi et al. | |

OTHER PUBLICATIONS

International Preliminary Report on Patentability, Mailed Sep. 24, 2015 for PCT/US2014/020628 filed Mar. 5, 2014.

* cited by examiner

*Primary Examiner* — David B Jones
(74) *Attorney, Agent, or Firm* — Kacvinsky Daisak Bluni PLLC

(57) ABSTRACT

A system and method are disclosed for polishing and lubricating an aluminum welding wire. The system and method draw stock aluminum wire from a spool, subject the stock wire to a plurality of drawing and thermal treatment steps to obtain a wire having a final diameter suitable for use in a continuous welding apparatus. Immediately after the final drawing step, the wire is subjected to a polishing and lubricating process in which a cord that is impregnated with a lubricant is passed over the surface of the wire. The cord serves to remove contaminants, such as metal fines, from the surface of the wire, and also to provide a layer of lubricant over the surface of the wire. The resulting wire has an improved appearance, will not clog the automatic welding apparatus, and the lubricant will not contribute adversely to weld porosity in use.

8 Claims, 3 Drawing Sheets

SYSTEM AND METHOD FOR POLISHING AND LUBRICATING ALUMINUM WELDING WIRE

BACKGROUND OF THE INVENTION

1. Field of the Invention

Embodiments of the invention generally relate to the manufacture of welding wire, and more particularly to a system and method for polishing and lubricating aluminum welding wire.

2. Discussion of Related Art

Aluminum welding wire is often used in continuously fed welding machines. During manufacture, the wire is subjected to various processes including one or more drawing processes that result in a wire having a desired diameter. The drawn wire is then spooled in several layers on a spool or wound into a drum, both of which are for gas metal arc welding or the gas metal arc welding process. When fit up to a continuous welding apparatus, it may be fed off the spool through guides in the feeding means of the continuous welding apparatus. Within such continuous welding apparatus, the wire comes in contact with many parts, including but not limited to, drive rolls, contact tip, guides, and a liner. In order to perform satisfactorily in the welding operation, the aluminum wire must be free from surface contaminants, such as drawing lubricants, so that such contaminants do not contribute to weld defects, such as porosity and the like.

Providing aluminum welding wire that is free of surface contaminants in the form of hydrocarbons (i.e., lubricants) can also be a problem. Lubricant-free wire can result in an undesirable amount of friction during the wire feeding process. Such high degrees of friction can generate wire particulates, which are tiny pieces of material scratched off of the surface of the wire.

In addition, 5xxx-series aluminum alloys have a high level of magnesium. As such, diamond draw dies must be used to fabricate the wire from an original, large, diameter to a smaller diameter. The diamond draw dies scratch the surface of the wire and themselves generate small particulates of aluminum termed fines. These fines can be 1-micron in size or less and are very hard. The fines adhere to the wire's surface, and when the wire is later fed through welding equipment, the fines can dislodge and become embedded in the inner diameter of the liner of the welding equipment. Such build-up can cause additional scratching of the wire's surface. In addition, over time the liner can build up extensive wire shavings that can eventually fully impede the wire's movement through the liner.

This wire shaving problem has never been totally eliminated with clean, lubricant-free wire. Inert lubricants such as carbon/graphite have been used, but such lubricants are particulate materials that adhere to the wire's surface, and although they reduce the tendency for shaving generation, they do not totally eliminate it due to the amount of graphite that is disposed on the surface. That is, only a small portion of the wire's surface will have carbon/graphite particulate on it, so the sensitivity of the lubricant is minor versus having the entire wire's surface coated with a lubricant. Trials have been conducted with other non-hydrocarbon lubricants such as polytetrafluoroethylene (PTFE), commonly known as Teflon. The problem with Teflon, however, is that it is an insulator, and as a result the current needed to melt the wire during the welding operation is non-uniform and so can create arc instability.

Other process changes have been attempted, such as adjusting the wire's temper/hardness, making cast and helix changes, and adjusting wire diameter have been attempted in an effort to eliminate the shaving problem, but none of these attempts have met with success. Thus, there remains a need for an improved process for providing aluminum welding wire for use in continuously fed welding machines that is substantially free of scratches and that also minimizes the chance for generating fines that can reduce the efficiency of such machines.

SUMMARY OF THE INVENTION

A method is disclosed for treating a welding wire. The method may include the steps of: feeding stock wire from a spool to a drawing stage, drawing the stock wire to produce a reduced diameter wire, thermally treating the reduced diameter wire to produce thermally treated wire, drawing the thermally treated wire to produce a final diameter wire, polishing to remove particulate contamination from a surface of the final diameter wire, applying lubricant, and winding the polished wire onto a spool or into a drum.

A system is disclosed for treating a welding wire. The system may include an unspooling stage for unspooling stock wire, a first drawing stage for receiving the stock wire from the unspooling stage and for reducing the stock wire to a reduced diameter, a thermal treatment stage for receiving the reduced diameter wire from the first drawing stage and for thermally treating the wire, a second drawing stage for receiving the thermally treated wire from the thermal treatment stage and for drawing the thermally treated wire to produce a final diameter wire; a polishing stage for receiving the final diameter wire from the second drawing stage and for removing particulate contamination from a surface of the final diameter wire, a lubricating stage for applying lubricant, and a spooling stage for winding the polished wire onto a spool or a drum.

A length of welding wire is disclosed. The welding wire may have a surface substantially free from metal fines, and a layer of lubricant disposed on the outer surface of the wire. In some embodiments the wire is an alloy of aluminum. In other embodiments the lubricant is selected from the list consisting of Molybdenum and Potassium.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

A system and method are disclosed for use in polishing and lubricating aluminum welding wire. Although the system and method are disclosed for use with aluminum wire, it will be appreciated that the principles of the disclosure can be used with wires of other materials, such as copper.

As described, prior attempts at manufacturing aluminum welding wire have focused primarily on providing surface lubricants to minimize friction in an attempt to reduce generation of fines. As will be described in greater detail later, the disclosed system and method focus on removing fines from the wire's surface, and applying a small amount of lubricant evenly over the surface of the wire.

In one embodiment, fines are removed from the wire's surface using a wire polishing technique. An example of such a polishing technique is disclosed in U.S. Pat. Nos. 5,382,455 and 5,409,535 to Boockmann, the entirety of which patents are incorporated by reference herein. The Boockmann technique utilizes a polishing cord to remove fines from the surface of a wire. A small amount of lubricant may be applied to the polished wire. In one embodiment this lubricant includes Molybdenum (Mb). In another embodiment the lubricant is applied during the polishing process. For example, the polishing cord may be impregnated with a quantity of the lubricant so that as the cord polishes the wire, the lubricant is evenly applied to the wire's surface.

Figure 1:
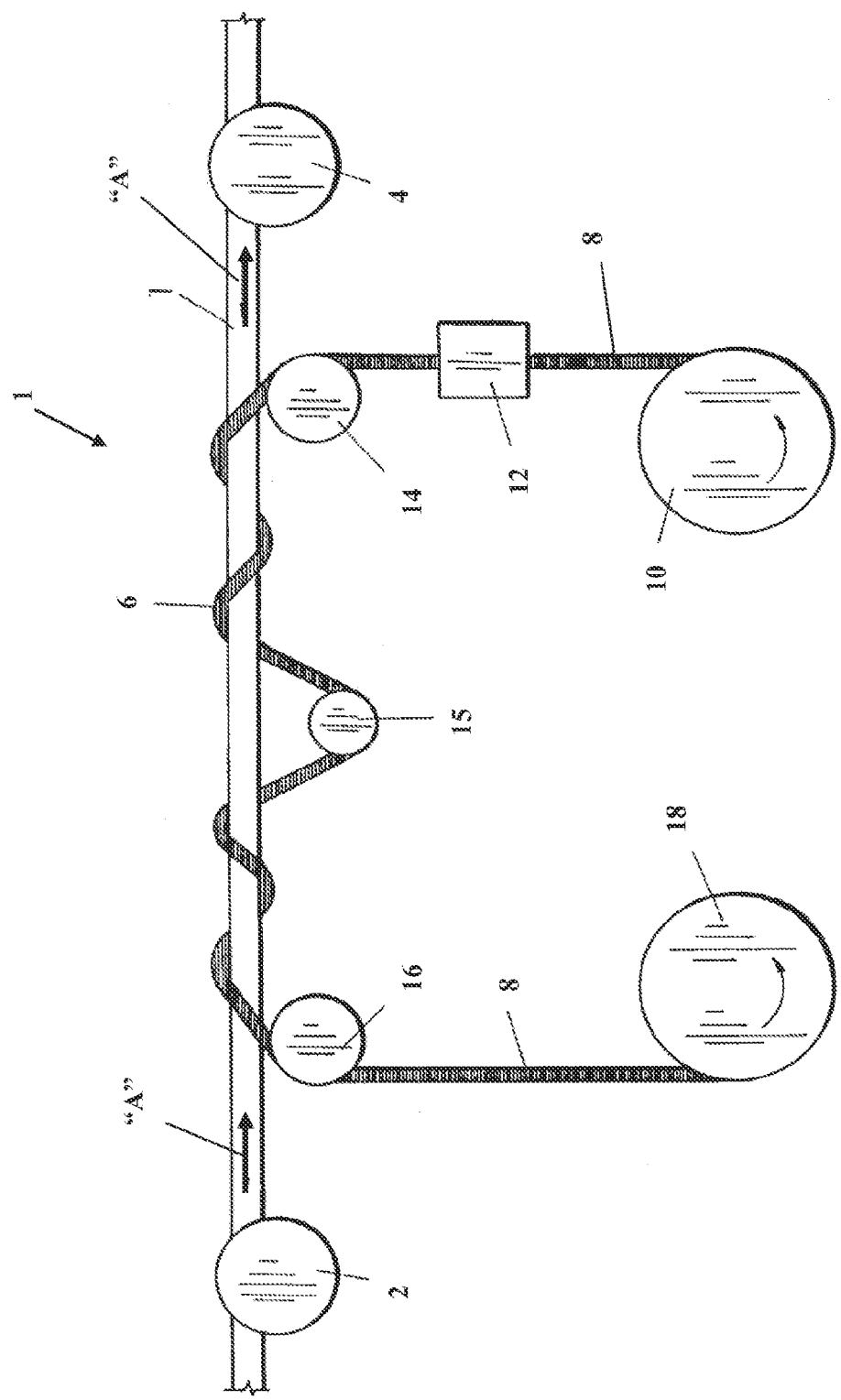
FIG. 1 is a schematic of an exemplary wire polishing apparatus for use in the disclosed system and method.

FIG. 1 illustrates an exemplary wire polishing arrangement for use with the disclosed system and method. Although a specific wire polishing/lubricating arrangement will be described, it will be appreciated that such an arrangement is provided for illustrative purposes only, and is not limiting. As such, the disclosed system and method may be used with a variety of other appropriate polishing and lubricating techniques.

As shown in FIG. 1, a continuous length of aluminum wire 1 may be fed in the direction of arrow "A," from right to left over a pair of rollers 2, 4 and through a plurality of loops 6 of a strand of cord 8 which has been impregnated with a quantity of lubricant. In non-limiting exemplary embodiments, the cord 8 may be made from a weave of viscose and aramide. In some embodiments, one or more strands of the cord 8 may be impregnated with a lubricant or an anti-wear agent. The strand of cord 8 is unwound from a spool 10. The strand of cord 8 is unwound and guided by a tension measuring device 12 and a first direction-changing roller 14 in coils around the wire 1 to an auxiliary roller 15, then to a second direction-changing roller 16 and to a driven spool 18.

In some embodiments, the aluminum wire 1 and the cord 8 move in opposite directions. In other embodiments the aluminum wire 1 and the cord 8 move in the same direction. In one non-limiting exemplary embodiment, the wire 1 may move in the direction of arrow "A" at a speed of about 1400 feet per minute (fpm), while the cord 8 may move in the opposite direction at a speed of about 25 centimeters per minute (cpm).

Owing to the relative movement of the cord 8 and the aluminum wire 1, the cord 8 scrubs off any fines residing on the surface of the wire. The fines are embedded in the cord and carried away from the wire. At the same time, a quantity of the lubricant, which may be impregnated in the cord 8, is transferred to the surface of the wire so that a lubricated, fine-free, wire is produced. The wire may then be transferred to a spool for transport, storage, and use.

In one non-limiting exemplary embodiment, the cord 8 is impregnated with a mixture of a release agent and a Mb lubricant in sufficient quantity to provide a desired amount of lubricant on the finished wire surface. In one embodiment, the release agent may be mineral spirits. The mineral spirits may act as a release agent for the Mb lubricant so that as the cord 8 passes over the wire 1, the lubricant is released onto the surface of the wire 1. Due to the fact that the cord 8 wraps around the wire 1, the lubricant is evenly deposited on to the entire surface of the wire, which is an improvement over prior techniques which result in uneven lubricant application. In some embodiments, the lubricant may be deposited in a quantity of from about 0.2 mg/m$^2$-5 mg/m$^2$ over the wire surface.

One advantage of using Mb as the lubricant is that it may have minimal impact on resulting weld quality. It will be appreciated, however, that other lubricants may also be used, such as Potassium. In addition, any of a variety of appropriate anti-wear compounds can be used.

Figure 2:
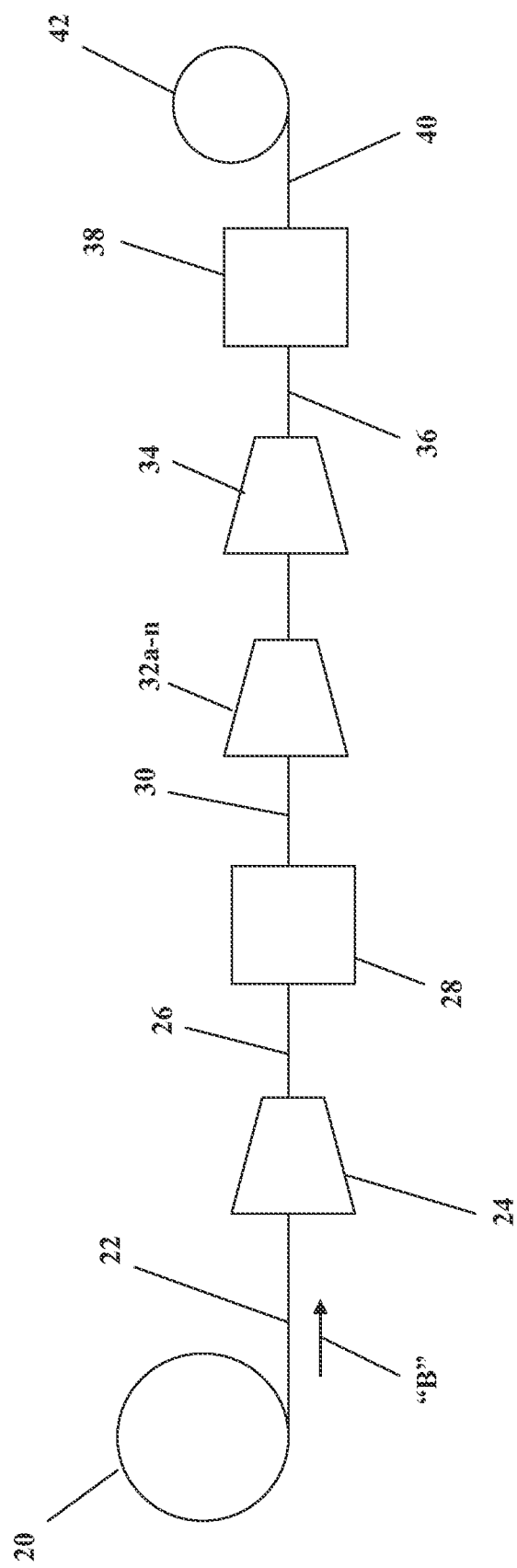
FIG. 2 is a schematic of an exemplary embodiment of the disclosed system.

As will be understood by one of ordinary skill in the art, the manufacture of welding wire can include a plurality of drawing, heat treating and other processing steps for treating the wire and reducing the wire diameter from a stock diameter to a final diameter suitable for a particular continuous welding application. Referring now to FIG. 2, an exemplary wire manufacturing system will be described. A reel 20 containing stock aluminum wire 22 having a first diameter may be provided. The stock aluminum wire 22 may be fed in the direction of arrow "B" to a first drawing stage 24 where the diameter of the stock wire 22 may be reduced to a second diameter that is smaller than the first diameter. In one non-limiting exemplary embodiment, the stock aluminum wire 22 may have a diameter of about 9.5 millimeters (mm), and the first drawing stage may result in a second diameter of about 3.2 mm. The drawn wire 26 may then be directed to a thermal treatment stage 28 where one or more thermal treatment processes may be performed. Although shown as a single thermal treatment stage, it will be appreciated that multiple individual heat treatment stages may be used. In addition, the wire may be subjected to individual drawing steps interspersed with individual heat treatment steps as desired. One or more of the heat treatment steps may be annealing steps or homogenizing steps.

In addition, although only a single drawing stage 24 is shown preceding the thermal treatment stage 28, it will be appreciated that more than one drawing process may be employed prior to thermal treatment. The thermally treated wire 30 may then be directed to one or more additional drawing stages 32a-n to further reduce the diameter of the wire by a desired amount. It will be appreciated that the additional drawing stages 32a-n can constitute any desired number of individual stages as appropriate to provide a wire having a desired final diameter. In one embodiment, the system may include up to fourteen individual drawing stages. A final drawing stage 34 may reduce the wire 36 to a desired final diameter. Subsequent to the final drawing stage the wire 36 may be directed to a polishing/lubricating stage 38 where aluminum and/or other particulate may be removed from the outer surface of the wire, and where a thin layer of lubricant may be applied to the exterior of the wire. In one non-limiting exemplary embodiment, the polishing/lubricating stage 38 employs the apparatus described in relation to FIG. 1. The drawn, polished, and lubricated wire 40 may then be loaded onto a spool 42 and packaged for storage, transport and use in a continuous welding apparatus.

In one exemplary embodiment up to fourteen drawing steps may be required to reduce the diameter of a stock wire to a final diameter for use in a continuous welding apparatus. Importantly, the polishing/lubricating stage 38 is positioned downstream of the final drawing stage 34 of the wire manufacturing process, just prior to the final wire packaging step. By performing the polishing/lubricating step just prior to packaging, the fines generated by all of the prior drawing steps can be removed in one polishing step.

As will be appreciated, the disclosed system and method perform two important functions. First, they remove the aluminum fines from the wire's surface, thus eliminating the wire shavings during the welding process. Second, it adds a thin and uniform layer of lubricant to the wire's surface, which reduces friction between the wire and the internal components of a continuous welding apparatus. The disclosed in-line wire polishing/lubricating system and method allow for retained weld integrity (i.e., little or no weld porosity issues), improved wire lubricity, and elimination of wire shavings during welding. In addition to these functional advantages, the system and method also result in improved wire surface cosmetics, providing the resulting wire with a bright and uniform surface appearance with no scratches or scuffing.

The effectiveness of the polishing/lubricating process was determined by means of the following tests: (1) wire feed testing, (2) weld porosity testing of polished wire, and (3) wire surface lubricity testing. The wire had a diameter of 1.2 mm, and the lubricant was applied to about 0.2-5.0 mg/m². It will be appreciated that smaller and larger diameter wires can be used as well (e.g., from 0.8 mm to about 2 mm).

Wire Feed Test

The wire feed test was performed to simulate "real world" conditions that have been found to produce wire shavings during welding. The test was composed of feeding both standard process and polished and lubricated wires though a 12 ft. long welding torch assembly for 60 minutes. The assembly included a number of bends intended to replicate worst case bending during operation. The torch liner material, dimensions and wire feed speed were selected for each wire diameter based on "normal" industry values. At the completion of each 1 hour feed test, the weld liner was swabbed out and the amount of fines characterized. The feed test was characterized as a failure if wire shavings were swabbed out of the liner. Results are tabulated in Table 1, below.

Weld Porosity Test

The Weld Porosity Test was performed in accordance with Section 11 of the AWS A5.10:1999 "Specification for Bare Aluminum and Aluminum-Alloy Welding Electrodes and Rods." Samples of both standard production and polished/lubricated wire produced over an extended period of time were welded and radiographed for weld porosity. The total allowable porosity in a 6-inch length of weld is 0.0225 in². Results are tabulated in Table 1, below.

Wire Surface Lubricity Test

Wire surface lubricity was determined by measurement of the static coefficient of friction (p) of two sets of wires sliding against each other as follows:

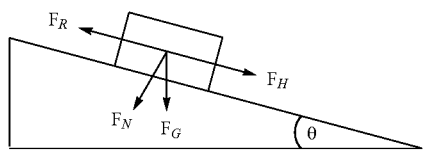

$$\mu = \frac{F_R}{F_N}$$

$F_N$=Normal Force
$F_H$=Force Applied by Downhill Slope
$F_G$=Gravitational Force
$F_R$=Friction Force
$\mu$=Static Coefficient of Friction The Static Coefficient of Friction was determined by increasing the angle θ until the sliding plate starts to move ($F_H$>$F_R$). To better represent the actual friction experienced in the feed liner during welding, multiple friction measurements were taken on each of three sides (0°, +90°, −90°) of a single wire sample. An average friction value was calculated for each of the three sides and these three values were averaged to determine the wire's overall static coefficient of friction value for the sample. Results are tabulated in Table 1, below.

Test Results

Results from these tests are summarized in Table 1, below:

TABLE 1

| Test | | Standard Process Wire (Sample Size = 18) | Polished and Lubricated Wire (Sample Size = 25) |
|---|---|---|---|
| Coefficient of Friction-μ | Mean | 0.54 | 0.35 |
| | 95% C.I. | 0.51-0.58 | 0.31-0.38 |
| Weld Porosity (AWS A5.10-1999) | Mean | 0.005 in² | 0.006 in² |
| | 95% C.I. | Passes industry standard 0.003 in²-0.006 in² | Passes industry standard 0.005 in²-0.008 in² |
| Feed Test (1 Hr) | Failure Rate | 53.8% | 0.0% |

As can be seen, the disclosed system and method provide welding wire having a substantially reduced coefficient of friction as compared to standard process wire. In addition, the disclosed system and method provide welding wire that passes industry standards for weld porosity, and that generates acceptable levels of particulate generation, and maintains a uniform, stable, welding arc.

It will be appreciated that different lubricants and cords styles and materials can be used to modify or change wire characteristics. Cord speed, cord tension, type of cord, type of lubricant, polish distance, where the polishing machine is placed (e.g., stand alone, or in-line with other manufacturing operations) can also be adjusted to provide wire with desired physical characteristics. In addition, other types of wires (e.g., steel, copper, etc) can be polished and lubricated using the disclosed system and method.

Figure 3:
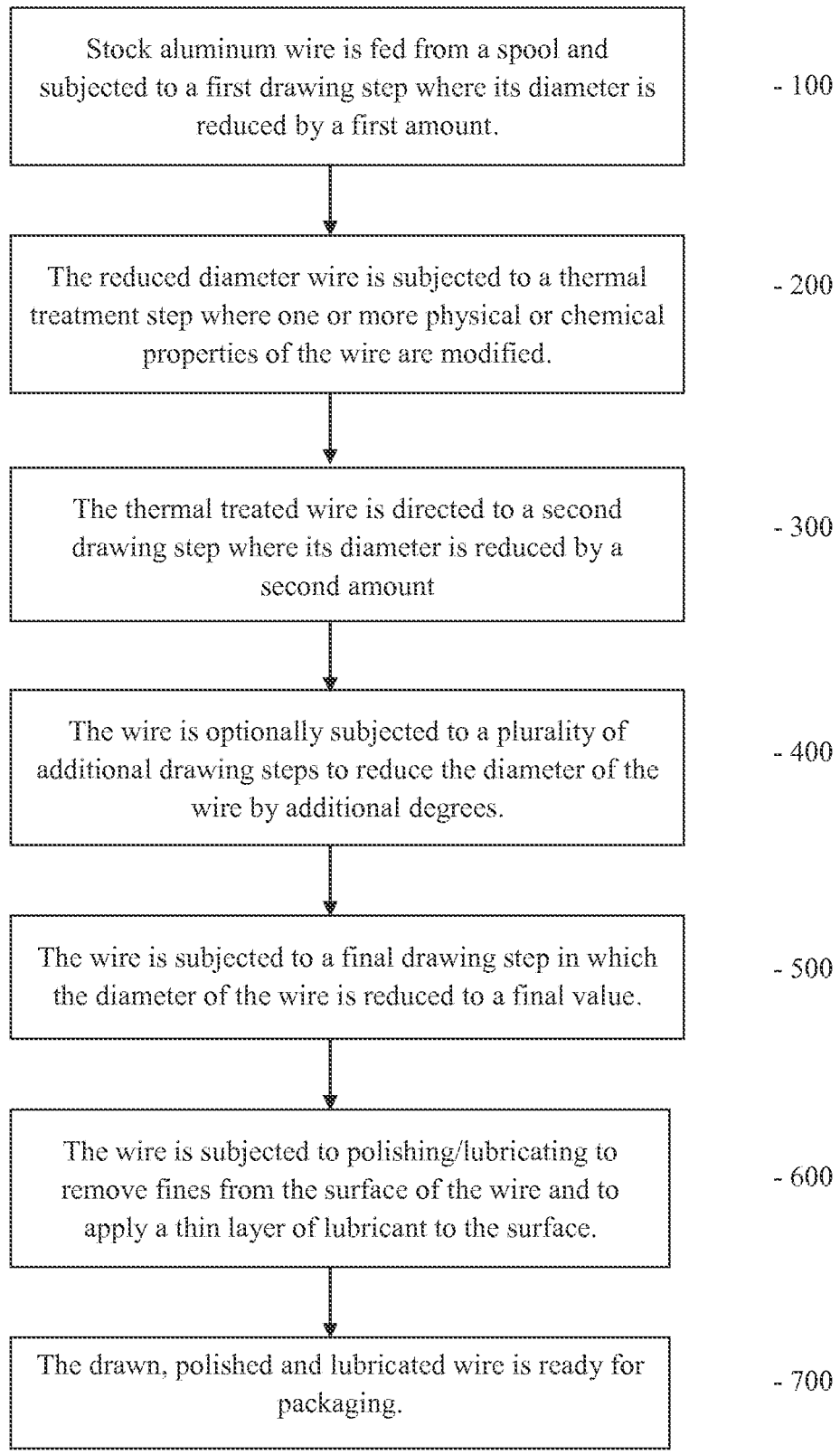
FIG. 3 is a logic flow of an exemplary embodiment of the disclosed method.

Referring now to FIG. 3, an exemplary method according to the disclosure will be discussed. At step 100, stock aluminum wire is fed from a spool and subjected to a first drawing step where its diameter is reduced by a first amount. At step 200, the reduced diameter wire is subjected to a thermal treatment step where one or more physical or chemical properties of the wire are modified. At step 300, the thermal treated wire is directed to a second drawing step where its diameter is reduced by a second amount. At step 400, the wire is optionally subjected to a plurality of additional drawing steps to reduce the diameter of the wire by additional degrees. At step 500 the wire is subjected to a final drawing step in which the diameter of the wire is reduced to a final value appropriate for an automatic welding apparatus. At step 600, the wire is subjected to a polishing/lubricating step in which aluminum fines are removed from the surface of the wire and a thin layer of lubricant is applied to the surface. In one embodiment, the lubricant includes Mb applied at about 0.2 to about 5.0 mg/m². At step 700 the drawn, polished and lubricated wire is ready for packaging.

In one embodiment, the disclosed process is a continuous process from unspooling from the stock aluminum wire spool to winding onto the storage spool. In one non-limiting exemplary embodiment, the feed speed of the wire is about 2000 fpm. In other embodiments, the process may be a discontinuous process in which portions of the processing steps are performed discretely.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A method of treating a welding wire, comprising:
   feeding stock wire from a spool to a drawing stage,
   drawing the stock wire to produce a reduced diameter wire,
   drawing the reduced diameter wire to produce a final diameter wire,
   polishing the final diameter wire to remove particulate contamination from a surface of the final diameter wire by passing a cord over the surface of the final diameter wire, and
   winding the polished wire onto a spool or into a drum.

2. The method of claim 1, comprising thermally treating the reduced diameter wire to produce thermally treated wire.

3. The method of claim 2, wherein the feeding, drawing, thermally treating, polishing and winding steps are part of a continuous manufacturing process.

4. The method of claim 3, wherein the feeding, drawing, thermally treating, polishing and winding steps are discrete parts of a non-continuous manufacturing process.

5. The method of claim 1, wherein the stock wire is an aluminum alloy, and the final diameter is a diameter suitable for use in a continuous welding apparatus.

6. The method of claim 1, wherein passing a cord over the surface of the wire comprises wrapping the cord around the wire and moving the cord in a direction opposite to a moving direction of the wire.

7. The method of claim 1, further comprising lubricating the final diameter wire to provide a thin layer of lubricant on the surface of the wire.

8. The method of claim 7, wherein the lubricant is selected from the list consisting of Molybdenum and Potassium.

* * * * *